(12) United States Patent
Morimoto

(10) Patent No.: US 12,164,549 B2
(45) Date of Patent: Dec. 10, 2024

(54) DOCUMENT SEARCH METHOD

(71) Applicant: Shimadzu Corporation, Kyoto (JP)

(72) Inventor: Kentaro Morimoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 681 days.

(21) Appl. No.: 17/285,790

(22) PCT Filed: Oct. 16, 2018

(86) PCT No.: PCT/JP2018/038474
§ 371 (c)(1),
(2) Date: Sep. 30, 2021

(87) PCT Pub. No.: WO2020/079749
PCT Pub. Date: Apr. 23, 2020

(65) Prior Publication Data
US 2022/0027397 A1 Jan. 27, 2022

(51) Int. Cl.
*G06F 40/30* (2020.01)
*G06F 16/33* (2019.01)
(Continued)

(52) U.S. Cl.
CPC ........ *G06F 16/3334* (2019.01); *G06F 40/247* (2020.01); *G06F 40/268* (2020.01); *G06F 40/58* (2020.01)

(58) Field of Classification Search
CPC ......... G10L 15/00; G10L 19/00; G10L 21/00; G10L 25/00; G06F 16/3334;
(Continued)

(56) References Cited

U.S. PATENT DOCUMENTS 9,235,806 B2 * 1/2016 Sweeney .................. G06N 5/02
2002/0004786 A1 * 1/2002 Tagawa ................ G06Q 20/382
705/64
(Continued)

FOREIGN PATENT DOCUMENTS

AU 2004213986 A1 9/2004
AU 2008292781 A1 3/2009
(Continued)

OTHER PUBLICATIONS

Zhou et al., "Supervised Approaches for Japanese Wikification," 2017, Information Processing Society of Japan.
(Continued)

*Primary Examiner* — Jialong He
(74) *Attorney, Agent, or Firm* — Muir Patent Law, PLLC

(57) ABSTRACT

In order to provide a case search system in which a search case corresponding to the notation fluctuation of a word within a sentence is a learning object, a sentence constituting a search target case is divided into a plurality of words by a morphological analysis, and a synonym integration unit 20 converts a predetermined word group within the sentence based on the relationship between the plurality of words into a single word consisting of another language in a synonym relationship with the word group. Further, the predetermined word group within the sentence is converted to a sentence with words stored in the corpus and the sentence is integrated, and the search target case composed of the integrated sentence is vectorized by leaning.

9 Claims, 5 Drawing Sheets

(51) Int. Cl.
*G06F 40/247* (2020.01)
*G06F 40/268* (2020.01)
*G06F 40/58* (2020.01)

(58) Field of Classification Search
CPC ...... G06F 40/247; G06F 40/268; G06F 40/58; G06F 16/33; G06F 40/216; G06F 40/284; G06F 40/30; G06F 16/3344
See application file for complete search history.

(56) References Cited

U.S. PATENT DOCUMENTS

| | | | |
|---|---|---|---|
| 2004/0243390 A1* | 12/2004 | Pinkham | G06F 40/44 704/2 |
| 2004/0260679 A1* | 12/2004 | Best | G06F 16/9538 |
| 2005/0108001 A1* | 5/2005 | Aarskog | G06F 40/253 704/10 |
| 2007/0271247 A1* | 11/2007 | Best | G06F 16/9535 |
| 2007/0288503 A1* | 12/2007 | Taylor | G06F 16/9535 707/999.102 |
| 2011/0259129 A1 | 10/2011 | Murata et al. | |
| 2014/0040275 A1* | 2/2014 | Dang | G06F 40/30 707/741 |
| 2014/0303957 A1* | 10/2014 | Lee | G06F 40/58 704/2 |
| 2015/0127634 A1* | 5/2015 | Hong | H04L 67/02 707/722 |
| 2015/0363384 A1* | 12/2015 | Williams | G06F 40/30 704/9 |
| 2016/0048936 A1* | 2/2016 | Perkowski | G06Q 10/063 705/310 |
| 2016/0085853 A1* | 3/2016 | Zelevinsky | G06F 16/338 707/765 |
| 2017/0075877 A1* | 3/2017 | Lepeltier | G06F 40/117 |
| 2017/0177712 A1 | 6/2017 | Kopru et al. | |
| 2018/0075017 A1* | 3/2018 | Takase | G06F 16/3344 |
| 2018/0233344 A1* | 8/2018 | Oka | H01J 49/0031 |
| 2019/0251455 A1 | 8/2019 | Spangler et al. | |
| 2020/0012789 A1* | 1/2020 | Usui | G06F 18/23 |

FOREIGN PATENT DOCUMENTS

| | | |
|---|---|---|
| CA | 2914398 A1 | 3/2009 |
| JP | 1999045254 | 2/1999 |
| JP | 2002083223 A | 3/2002 |
| JP | 2002257757 A | 9/2002 |
| JP | 2002259445 A | 9/2002 |
| JP | 2003115010 A | 4/2003 |
| JP | 2003173340 A | 6/2003 |
| JP | 2004295396 A | 10/2004 |
| JP | 2006146621 A | 6/2006 |
| JP | 2006331245 A | 12/2006 |
| JP | 2011103075 A | 5/2011 |
| JP | 2011175306 A | 9/2011 |
| JP | 2012059182 A | 3/2012 |
| JP | 2013020439 A | 1/2013 |
| JP | 2017004260 A | 1/2017 |
| JP | 2017528842 A | 9/2017 |
| JP | 2017201478 A | 11/2017 |
| JP | 2018010482 A | 1/2018 |
| JP | 2018132347 A | 8/2018 |

OTHER PUBLICATIONS

Decision of Refusal for corresponding Japanese patent application No. JP 2020-553210, dated Sep. 6, 2022.

* cited by examiner

DOCUMENT SEARCH METHOD

TECHNICAL FIELD

The present invention relates to a case search method for searching a desired case from a large number of search cases.

BACKGROUND ART

With the development of computer technology and communication networks in recent years, there has been an increasing demand for retrieving desired document data, information, and the like from a database in which a large number of electronic documents, information, and the like have been stored. In a general information search system, by inputting a search term (keyword) that best describes the content that the searcher wants to search, search processing (matching processing with the search term) is performed on a database in which document data, etc., is accumulated, and document data that matches the specified condition is output as a search result.

As a method of retrieving a desired document from a large amount of document data, a document data retrieval using natural language processing has been conventionally performed. Natural language processing (NLP: Natural Language Processing) is a series of techniques that makes a computer process a natural language that people use on a daily basis, and is one field of artificial intelligence and linguistics.

In the natural language processing in the field of artificial intelligence, vectorization of a word using machine learning is a central technique. For example, a "morphological analysis" used in natural language processing is processing of dividing a sentence or a phrase into minimum units (words) having a meaning and discriminating the part of speech and the like.

Machine learning is to iteratively perform learning from data, find a pattern (feature) that lies therein, and classify the data. It becomes possible to perform a prediction by applying the learned result to new data. In the machine learning in the natural language processing, a large amount of sentence information is processed (learned by a neural network) and a vector space representing a word is generated from the distribution of words appearing before and after.

For example, Patent Document 1 discloses the following information processing in the search site. Even in a case where input search queries are different in notation, processing of outputting the same search result is performed as long as the meanings of the search queries are the same. Therefore, in the information processing, based on the correlativity with the context before and after the synonym in the text data corresponding to the sentence containing the differently expressed synonyms, it is determined whether or not it is a synonym to be used properly depending on the manner including a predetermined meaning different from the meaning shared by synonyms, and information processing is performed based on the determination result.

Patent Document 2 discloses a synonym extraction system. In the system, a morphological analysis or a syntactic analysis is applied to each sentence constituting a document. The similarity between the word conceptual vectors is determined by a predetermined criterion. And combinations of words supposed to have a synonym possibility are extracted based on the semantic similarity of the vectors as synonym candidates.

PRIOR ART DOCUMENT

Patent Document

Patent Document 1: Japanese Unexamined Patent Application Publication No. 2017-4260
Patent Document 2: Japanese Unexamined Patent Application Publication No. 2013-20439

SUMMARY OF THE INVENTION

Problems to be Solved by the Invention

In the above-described semantic recognition of words by machine learning, for example, a vector is generated from distributions of words appearing before and after a certain word by learning the sentence, and distances between the vectors are regarded as similarities and the interpretation is performed. Further, it is assumed that sentences described in terms of matters having similar meanings are described using similar words. Under this assumption, a vector of a sentence can be generated from the frequency of appearance of a word described in a sentence, and the vector-to-vector distance between sentences represents the similarity between the documents.

In learning documents in which technical terms, such as, e.g., an analysis report, a technical report, a technical paper, and a research paper, are widely used, the nouns and the verbs are divided into morphemes by using an existing dictionary, but technical terms are often not registered in a dictionary. In addition, in some words used in technical reports, etc., for example, like "ミネラルウオーター vs ミネラルウォーター" (mineral water), "トリ グリセライド vs トリグリセリド" (triglyceride), there may be a fluctuation in the notation. In this case, according to the conventional learning, words with fluctuations are identified as different words.

This applies not only to Japanese, but also to words in other languages, for example English. For example, there is a notation fluctuation, such as, e.g., "organise vs organize", "emphasise vs emphasize", "sulphate vs sulfate". When words having such a fluctuation are learned by a conventional method, although they are treated as words close in the distance (close in the meaning) though they are different words, but as a result, the accuracy of learning is deteriorated.

In Patent Document 1, based on the result of learning about the appearance tendency, the usage mode, and the like of the differently-written synonyms included in the text data, the presence or absence of the name identification processing for the differently-written synonyms is determined, and the document fails to disclose the configuration for handling the notation fluctuation specific to languages, such as, e.g., Japanese and English.

The synonym extraction system of Patent Document 2 only extracts synonyms having the same meaning and different word forms from the input document relating to a predetermined matter, and does not disclose a configuration in which database is maintained by the extracted synonyms, nor a configuration corresponding to notation fluctuation.

The present invention has been made in view of the above-described problems, and the object thereof is to provide a case search system in which a search case corresponding to a fluctuation of a word notation within a sentence is used as a learning object.

Means for Solving the Problem

As a means for solving the above-described problems, the present invention relates to a case search method that searches a predetermined case from search target cases stored in a database. The case search method includes the steps of:
dividing a sentence constituting the search target case into a plurality of words by a morphological analysis;
extracting a predetermined word group from the sentence based on relationships between the plurality of words;
converting the predetermined word group into a single word composed of another language in synonym relationship with the word group;
storing the word unified into a synonym by the converting in a corpus;
integrating the sentence by replacing the predetermined word group within the sentence with the word stored in the corpus; and
vectorizing a search target case composed of the integrated sentence by learning,
wherein the vectorized search target case serves as a search target of the predetermined case.

In the above-described case search method, preferably, the predetermined word group is composed of synonymous words different in spelling or notation from each other, and the integrated sentence is a sentence in which the words different in the spelling or notation are unified into a unique word. Further, preferably, the case search method further includes a step of storing a word vector of the word unified to the synonym and a sentence vector including the word vector in a database. Further, preferably, the database stores a word vector by a plurality of different languages corresponding to a synonym relationship. Further, preferably, the converting step acquires a translation of another language for the predetermined word group from a thesaurus prepared in advance. Further, preferably, the case search method further includes a step of performing a morphological analysis on a search string for searching the predetermined case. Further, preferably, the search target case, the sentence, and the search string include at least one of an analysis report, an analysis relevant article, an analysis relevant patent document, an analysis relevant search keyword, an analysis relevant compound name, and an analysis relevant analysis target name for a given sample.

Effects of the Invention

According to the present invention, a search target within a case database is vectorized by learning after preprocessing with synonym unified document data, so that the learning of the document data corresponding to a notation fluctuation can be performed.

EMBODIMENTS FOR CARRYING OUT THE INVENTION

Figure 1:
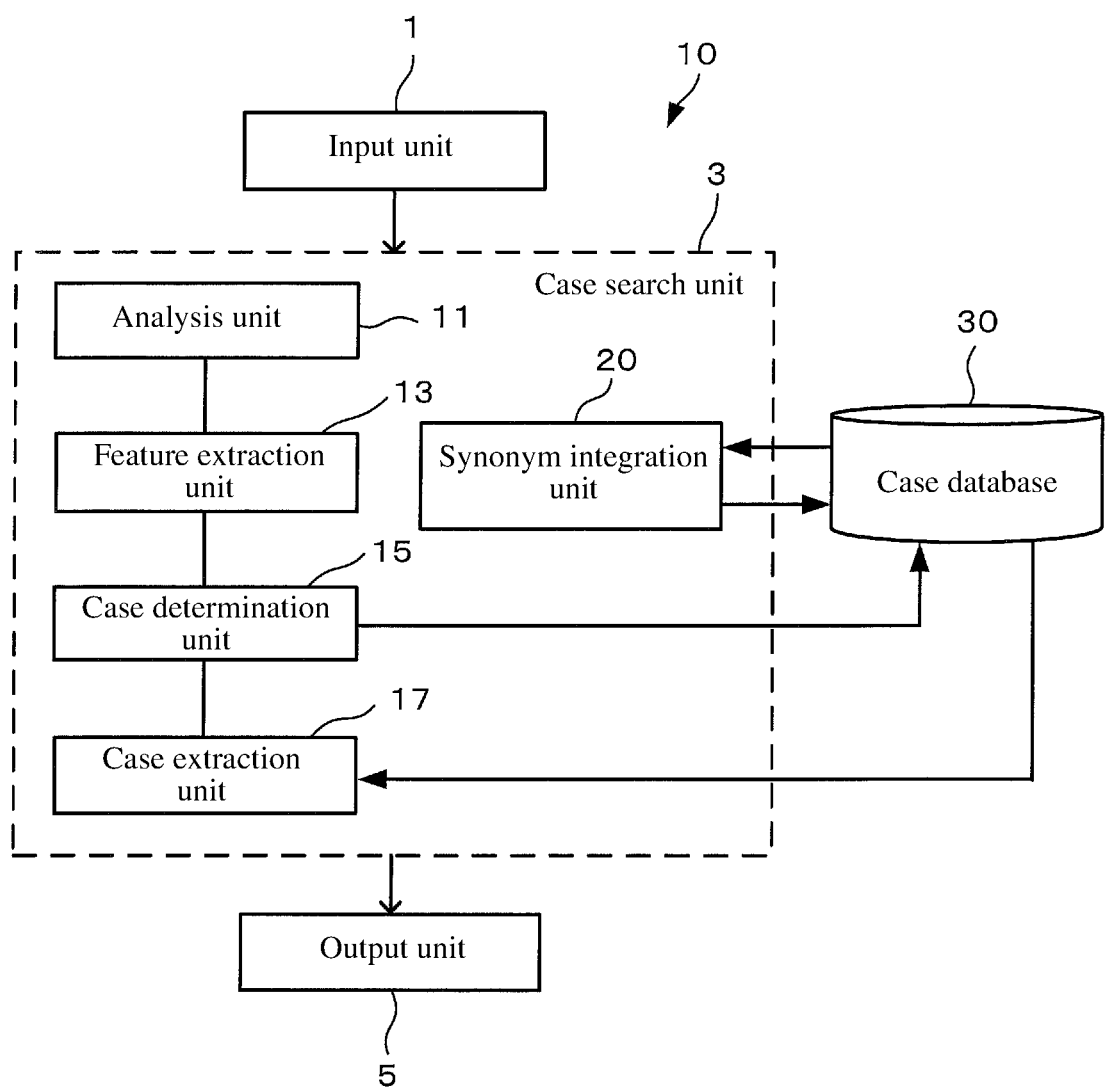
FIG. 1 is a block diagram showing an example of a configuration of a case search system according to an embodiment of the present invention.

Hereinafter, an embodiment according to the present invention will be described in more detail with reference to the attached figures. FIG. 1 is a block diagram showing an example of the configuration of a case search system according to an embodiment of the present invention. The case search system 10 of FIG. 1 is provided with an input unit 1, a case search unit 3, and an output unit 5. The case search unit 3 is provided with an analysis unit 11, a feature extraction unit 13, a case determination unit 15, a case extraction unit 17, and a synonym integration unit 20.

The case search system 10 is configured to be accessible to the case database 30 storing a large number of cases as search targets. The case search system 10 extracts a predetermined word for the search keyword, the sentence, or the like, input as a search term by a searcher (also referred to as a "user" or the like) using a morphological analysis and searches cases within the case database 30 using the extracted word. The retrieved case is displayed on the output unit 5 as document data or the like.

Note that the search target case in the case search system according to this embodiment includes, for example, an analysis report, an analysis relevant article, and an analysis relevant patent document. Here, the analysis report denotes a report of an analysis case or an analysis result, such as, e.g., "the pesticide residues of the AA sample were analyzed using the ○○ device" and the like. An application news and an application note are also included in the analysis report.

The search keyword includes, for example, an analysis relevant search keyword, an analysis relevant compound name, an analysis relevant analysis target name, and the like.

In the input unit 1, a search string (also called "search keyword" or "search query") representing the search target by characters, a sentence, etc., is input by the user, etc. The input unit 1 is composed of, for example, an input device, such as, e.g., a keyboard and a mouse, and a display, such as, e.g., a liquid crystal display. A search string is input using the input screen on the display. The display also serves as the output unit 5 for displaying the search result, etc.

The analysis unit 11 performs a morphological analysis on the search keyword input from the input unit 1 based on a search dictionary defined in advance, and divides the search keyword into words of the smallest unit. A vector (a word vector or a feature vector) characterizing the search keyword is calculated. The feature extraction unit 13 receives the result of the morphological analysis and extracts the features of the search keyword.

The case determination unit 15 searches the cases (document data) stored in the case database 30 based on the feature of the search keyword acquired from the feature extraction unit 13. The document data in the case database 30 is a vector-featured document and is case data vectorized after preprocessing of integrating into a synonym described below.

That is, the case determination unit 15 calculates the degree of similarity between the document data unified by synonyms and the search keyword indicated by the feature vector and determines the presence or absence of document data indicated by the search keyword within the case database 30, based on the degree of coincidence or the degree of similarity.

The case extraction unit 17 extracts document data similar to the search query from the case database 30 upon receipt of the determination result from the case determination unit 15 and outputs it to the output unit 5. As a result, the user or the like can acquire the desired case (e.g., an analysis case) as document data.

Figure 2:
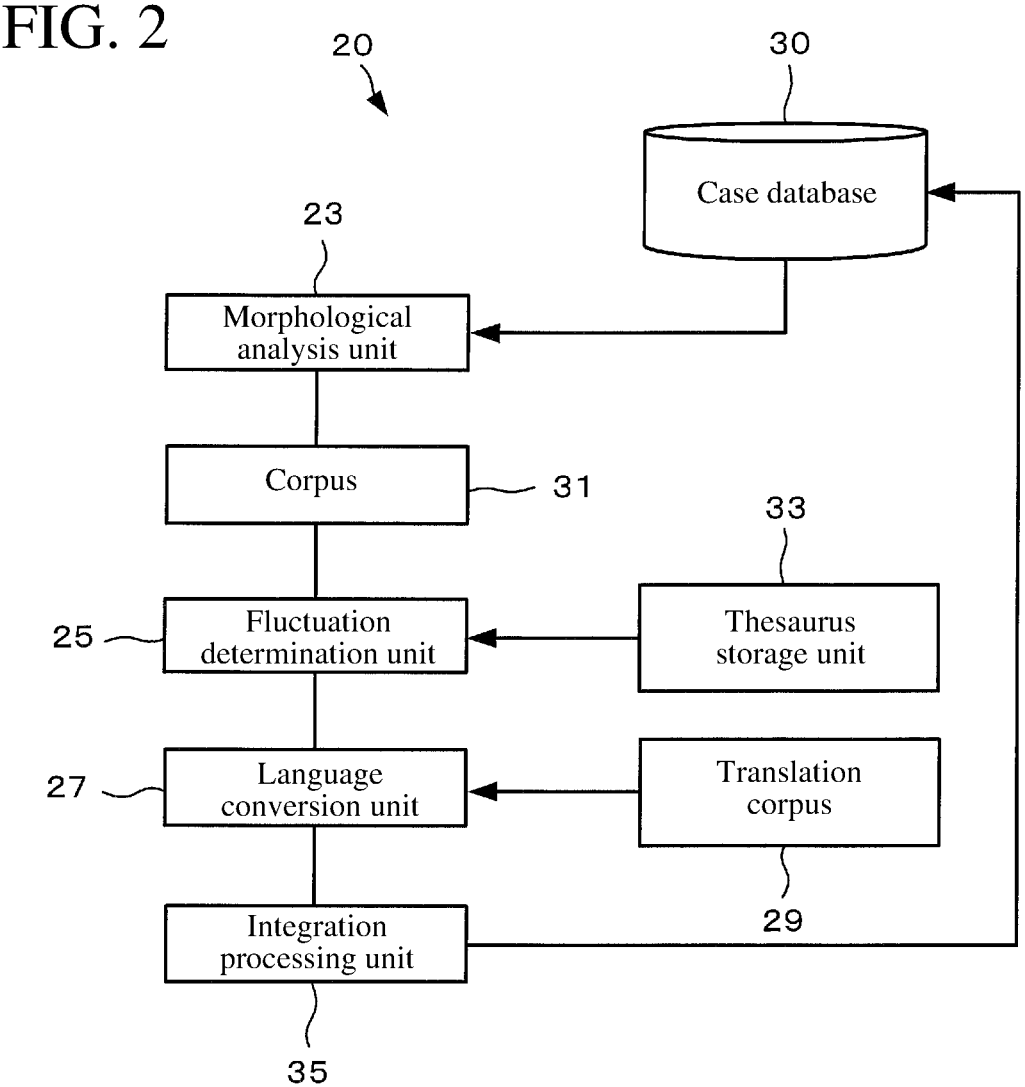
FIG. 2 is a block diagram showing a configuration of a synonym integration unit in the case search system.

Next, the synonym integration unit constituting the case search system of this embodiment will be described. FIG. 2 is a block diagram illustrating the configuration of the synonym integration unit 20 that integrates a predetermined word in a document in the case database 30 into a synonym in the case search system 1 of FIG. 1.

In FIG. 2, the morphological analysis unit 23 of the synonym integration unit 20 divides all case documents (Japanese documents, English documents, documents in which Japanese and English are mixed, etc.) stored in the case database 30 into words by a morphological analysis and constructs a word vector which is a semantic representation of the word. Since words appearing in a sentence are explained by words before and after the word, a vector space representing each word is generated from the distributions of words appearing before and after the word.

The result of the morphological analysis is stored in a corpus 31 having a multi-dimensional vector space with each word as a coordinate axis as, for example, a vector-mapped word vector in accordance with the usage frequency, etc., of the word. The distance between the vectors in the vector space of words (relationships between morphemes) represents the semantic similarity between the words.

Referring to the thesaurus storage unit 33, the fluctuation determination unit 25 extracts words having the same meaning, although the Japanese language is written differently, or words having the same meaning, although the English language is written differently (for convenience, they are referred to as "synonymous and different display words" or "variant synonyms", respectively), based on the distance between the vectors in the vector space of word vectors in the corpus 31. The thesaurus storage unit 33 has a structure in which, for example, meaning codes are assigned to a large number of Japanese and English words, and upper and lower relationships of the words are hierarchically classified.

In order to perform the above-described machine translation, words may be classified and arranged according to their meanings, and synonym, synonyms, antisynonyms, antonyms, broader terms, narrower terms, and the like, may be stored in the thesaurus storage unit 33.

To exemplify the fluctuation determination, in a case where the case database 30 includes descriptions of "ミネラルウォ ーターの分析" and "ミネラルウオー ターの分析", the descriptions are decomposed into "ミネラルウオーター (noun)", " の (postpositional particle)", " 分析 (noun)" and the like by a morphological analysis in the morphological analysis unit 23. After the removal of the postpositional particle from these constitutional elements (morphemes), the fluctuation determination unit 25 determines that "ミネラルウォ ーター" and "ミネラルウオーター" are nouns with potential fluctuations (variant synonyms) because their notations differ but the vectors are close.

As another example, the description "トリグリセリドの分析" and "トリグリセ ライドの分析" can be exemplified. Also in the case, "トリグリセリド" and "トリグリセ ライド" are considered to be nouns with potential fluctuations (variant synonyms) by the morphological analysis.

The fluctuation determination unit 25 sends the above-described nouns (variant synonyms) extracted as nouns with a potential fluctuation. The language conversion unit 27 performs machine translation processing on the extracted nouns with potential fluctuation. As the machine translation here, a conventional technique is used.

Note that in recent years, machine translation has made significant progress due to the dramatic improvement in the performance of the neural machine translation (NMT) using natural language processing by machine learning. However, there are problems in the accuracy of translations of technical terms which appear less frequently in documents and articles whose contexts appear.

For this reason, the language conversion unit 27 refers to the translation corpus 29 in which a large number of synonyms is accumulated as a word corresponding data set, and performs translations (e.g., Japanese to English, and English to Japanese) between words with a n potential fluctuation. By machine translation referring to the translation corpus 29, even a word that is not in the dictionary can be unified into a synonym.

The word uniquely obtained by the machine translation may be sequentially accumulated as new words in the translation corpus 29. The word in the translation corpus 29 may be classified by a synonym in the same field.

As a consequence of the fluctuation determination in the above-described example, in the language conversion unit 27, "ミネラルウオーター" and "ミネラルウオーター" are translated into a "mineral water", and "トリグリセリド" and "トリグリセライド" are translated into a "triglyseride". Similarly, in the case of English, "sulphate" and "sulfate" that are considered to have a potential fluctuation in the spelling as an English word are translated into "硫酸エステル"

The integration processing unit 35 unifies the case document containing a word with a potential fluctuation in the case database 30 into a document composed of synonyms based on the result of the machine translation by the language conversion unit 27.

Figure 3:
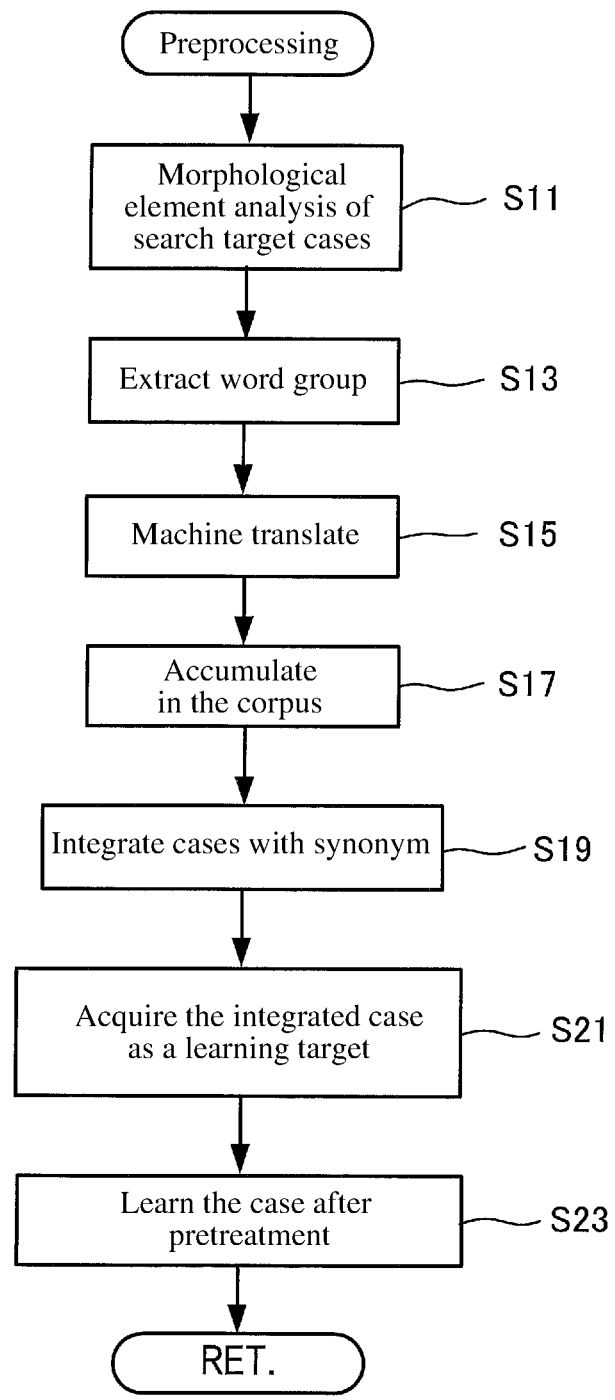
FIG. 3 is a flowchart showing the preprocessing in time sequence, which is performed prior to vectorizing a search target by learning.
Figure 4:
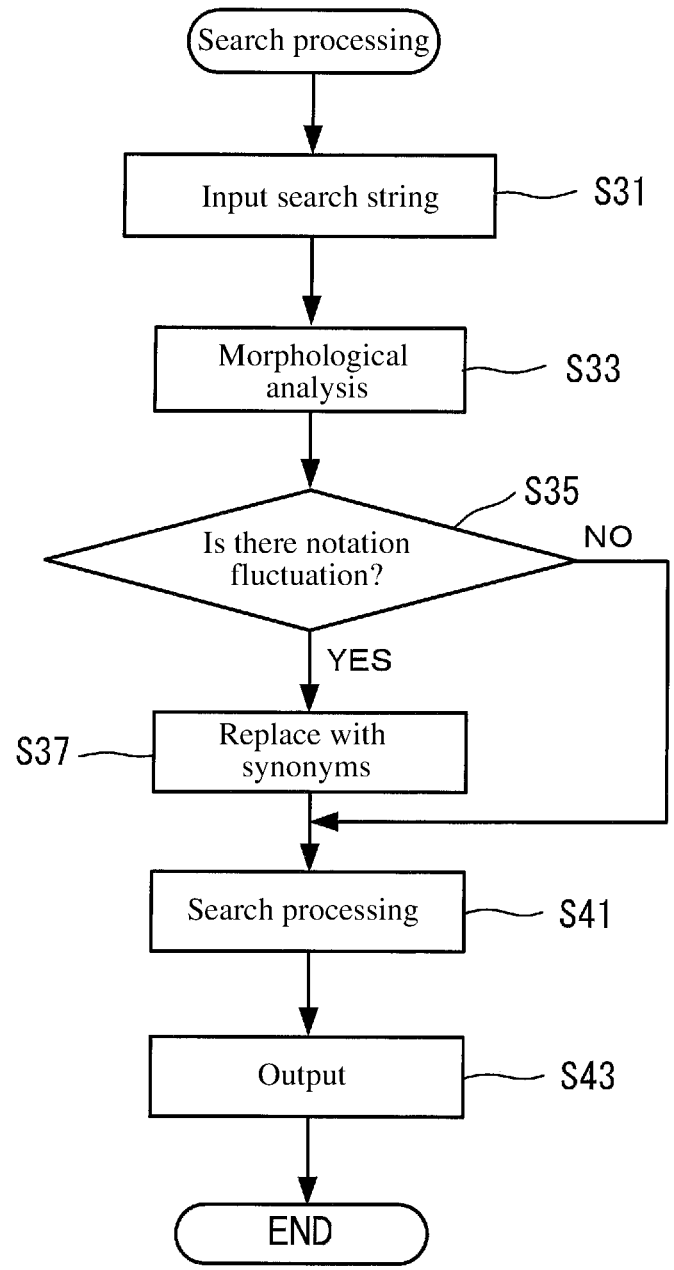
FIG. 4 is a flowchart showing search processing on a search target after preprocessing.

Next, the search processing steps in the case search system of this embodiment will be described. FIG. 3 is a flowchart showing the preprocessing to be performed in time sequence before vectorizing the search target by learning. FIG. 4 is a flowchart showing the search processing for the search target after the preprocessing.

In Step S11 of FIG. 3, the search target case (document data) stored in the case database 30 is divided into several words (morphemes) by a morphological analysis using an existing dictionary. In the subsequent Step S13, a predetermined word group is extracted from a document constituting the search target case, based on the distance, etc., of vectors between a plurality of divided words.

In the case of a Japanese language, the word group is a set of words that differs in notation but has the same meaning due to the presence of the notation fluctuation, and in the case of an English language, it is a set of words that differs in the spelling but has the same meaning. In the case of a Japanese language, the notation fluctuation is caused by variations in the okurigana (a declensional kana that is added after a Chinese character for the purpose of making clear a reading of "kanji"), variations in the size of characters, variations in the presence or absence of long notes in katakana notation, and the like. In English and other languages, there is a notation fluctuation (for example, British English and American English) due to differences in the spelling.

When an analysis report or the like containing non-uniform words with fluctuations (notation fluctuations) is subjected to learning, the respective words with fluctuations are learned as different words. Therefore, the word that appears before and after one of words with a fluctuation and the word that appears before and after the other of words with a fluctuation are treated as different words and learned. For this reason, the learning efficiency deteriorates significantly.

Therefore, in Step S15, the extracted word group is subjected to machine translation. Specifically, a Japanese word group will be translated into English, and an English word group will be translated into Japanese. This converts the Japanese or English word group into a single word of another language, English or Japanese, that is in a synonymous relationship. Then, in Step S17, the word unified to a synonym by the machine translation is stored in the corpus by defining a synonym list corresponding in Japanese and English.

In Step S19, the above-described word group constituting the document of the search target case is replaced by the word accumulated in the corpus, and the document is integrated with the synonym. As a result, the search target case is constituted by a document in which words are uniquely unified. Finally, in Step S21, the search target case composed of a synonymous integrated document is obtained as an object to be vectorized by learning in the following Step, using the corpus maintained by the machine translation.

That is, in Step S23, the search target case composed of the document integrated with synonyms by the above-described preprocessing is vectorized by learning. This yields, for example, a vectorized word and case document. Note that the case database 30 may store the word vector of the word unified in the synonym and the sentence vector containing the word vector.

Next, the search processing in the case search system of this embodiment will be described. In a case where a user, etc., uses the case search system of this embodiment to obtain a required case, a search string (search keyword) is input first in Step S31 of FIG. 4.

In Step S33, the search keyword is divided by the morphological analysis into the smallest unit morphemes (word vectors). In Step S35, as described above, referring to the corpus in which words defined in the synonym list corresponding to Japanese and English are accumulated, it is determined whether the search keyword itself is a word with a notation fluctuation or the search keyword contains a word with a potentially notation fluctuation.

In the case of a Japanese language, the notation fluctuation denotes a variation in the okurigana as described above, a variation according to the size of characters, a variation of the presence or absence of a long note in a katakana notation, or the like. Then, in Step S37, a word with a notation fluctuation is replaced with a word in another synonymous language. Further, in the case of the notation fluctuation due to the difference in the spelling in a language such as, e.g., English, it is replaced with another synonymous word of the language.

In Step S41, using the search keyword with no notation fluctuation or the search keyword in which the notation fluctuations are integrated into the synonyms, the search processing is performed on the search target case (a search target case composed of documents integrated with synonyms by the preprocessing) vectorized by the learning in Step S23 of FIG. 3, which is a search target.

In Step S43, upon receipt of the search processing in Step S41, a case that matches the search keyword input by the user or the like or a case that is closest to the search request is output. The retrieved case is output in the form of a case list based on the title or the like, for example. The user selects an appropriate case from the list of output cases.

Figure 5:
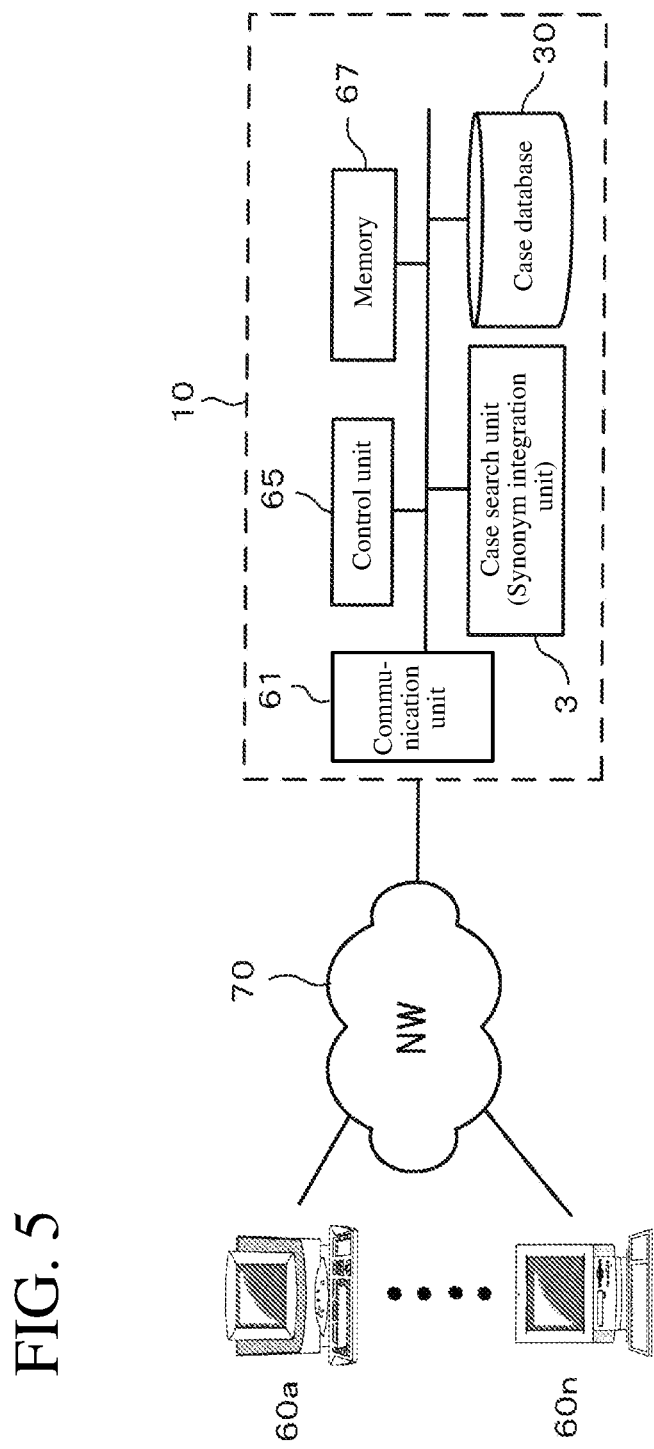
FIG. 5 is a diagram illustrating a configuration in which the case search system is connected via a network.

FIG. 5 shows a configuration in which the case search system of this embodiment is connected via a network (public communication network). As shown in FIG. 5, the case search system 10 according to this embodiment enables a retrieval of cases in response to a request from the user or the like, for example, in an Internet environment, and provides the search result to the user or the like.

Therefore, the case search system 10 and a plurality of user terminals 60a . . . 60n are connected to each other so as to be able to communicate with each other via an information and communication network 70, such as, e.g., the Internet and an intranet. The communication unit 61 in the case search system 10 is an interface with the network 70. The control unit 65 is configured by, for example, a microprocessor or the like that control the entire case search system 10 including the case search unit 3.

The memory 67 stores a preprocessing program to be executed before vectorizing the above-described search target by learning, a search processing program to the preprocessed search target, etc. The control unit 65 reads out these programs and executes the predetermined processing described above.

Note that the entire case search system 10 can also be considered as a server device connected to the network 70.

As described above, by performing the vectorization by learning after performing the preprocessing for making the document data as the search target within the case database document database integrated by the synonyms by the synonym integration, the learning of the document data, such as, e.g., an analysis report, corresponding to the notation fluctuation can be enabled.

Therefore, by unifying the analysis report, etc., by synonyms, it is possible to learn as a word appearing around the same word, which improves the learning efficiency.

Further, a search using a word keyword with no unique notation in Japanese, English, or the like, can be performed, and even a report mixed with Japanese and English can be searched.

Further, specializing an analysis report, an analysis related patent, an article, and related document, which are written in technical terms, by performing the natural language processing by learning, it becomes possible to evaluate similar compounds and similar analysis cases by the vector distances and return results that differ from a simple keyword search.

In addition, by using an analysis report or the like vectorized after the preprocessing as a search target, highly accurate retrieval can be performed easily and quickly, and an objective determination can be made on the obtained search result. In addition, the search accuracy and the search efficiency of document data containing notation fluctuations and the like can be improved.

DESCRIPTION OF SYMBOLS

1: Input unit
3: Case search unit
5: Output unit
10: Case search system

11: Analysis unit
13: Feature extraction unit
15: Case determination unit
17: Case extraction unit
20: Synonym integration unit
23: Morphological analysis unit
25: Fluctuation determination unit
27: Language conversion unit
29: Translation corpus
30: Case database
31: Corpus
33: Thesaurus storage unit
35: Integration processing unit
60a . . . 60n: User terminal
65: Control unit
67: Memory
70: Information and communication network

The invention claimed is:

1. A document search method for searching a predetermined document from search target documents stored in a database, the document search method comprising the steps of:
dividing a sentence constituting the search target documents into a plurality of words by a morphological analysis;
extracting a predetermined word group from the sentence based on relationships between the plurality of words;
converting the predetermined word group into a unique word generated by machine translation into another language in synonym relationship with the word group;
storing the unique word unified into a synonym by the converting in a corpus in which a synonym list corresponding to a plurality of languages is stored;
integrating the sentence by replacing the predetermined word group within the sentence with the unique word stored in the corpus;
vectorizing a search target document composed of the integrated sentence by machine learning,
receiving a search keyword input by a user;
calculating a feature vector characterizing the search keyword; and
extracting a search target document similar to the search keyword based on the degree of similarity between the vectorized search target document and the search keyword indicated by the feature vector,
wherein the document search method further comprises the steps of:
determining whether or not words of the search keyword input include a word with a different spelling referring to the corpus; and
replacing the word with the different spelling with a synonymous word in another language in a case in which the words include the word with the different spelling.

2. The document search method as recited in claim 1, wherein the predetermined word group is composed of synonymous words different in notation or spelling from each other, and the integrated sentence is a sentence in which the words different in the notation or the spelling are unified into the unique word.

3. The document search method as recited in claim 1, further comprising the step of:
storing a word vector of the unique word unified to the synonym and a sentence vector including the word vector in a database.

4. The document search method as recited in claim 3, wherein the database stores a word vector by a plurality of different languages corresponding to a synonym relationship.

5. The document search method as recited in claim 1, wherein the converting step acquires a translation of another language for the predetermined word group from a thesaurus prepared in advance.

6. The document search method as recited in claim 1, further comprising the step of:
performing a morphological analysis on a search string for searching the predetermined document.

7. The document search method as recited in claim 1, wherein the search target document, the sentence, and the search string include at least one of an analysis report, an analysis relevant article, an analysis relevant patent document, an analysis relevant search keyword, an analysis relevant compound name, and an analysis relevant analysis target name for a given sample.

8. A document search method for searching a predetermined document from search target documents stored in a database, the document search method comprising the steps of:
dividing a sentence constituting the search target documents into a plurality of words by a morphological analysis;
extracting a predetermined word group from the sentence based on relationships between the plurality of words;
converting the predetermined word group into a unique word generated by machine translation into another language in synonym relationship with the word group;
storing the unique word unified into a synonym by the converting in a corpus in which a synonym list corresponding to a plurality of languages is stored;
integrating the sentence by replacing the predetermined word group within the sentence with the unique word stored in the corpus; and
vectorizing a search target document composed of the integrated sentence by machine learning,
wherein the vectorized search target document serves as a search target of the predetermined document, and
wherein the document search method further comprises the steps of:
determining whether or not words of a search keyword input include a word with a different spelling referring to the corpus; and
replacing the word with the different spelling with a synonymous word in another language in a case in which the words include the word with the different spelling.

9. The document search method as recited in claim 1, wherein the converting the predetermined word group into a unique word generated by machine translation into another language is performed without converting another portion of the sentence into the other language.

* * * * *